United States Patent
Hughes et al.

[11] 3,849,742
[45] Nov. 19, 1974

[54] SYNCHRONOUSLY TUNED LASER TRANSMITTER AND RECEIVER

[75] Inventors: Richard Swart Hughes, China Lake; Julian L. Thompson, Keene, both of Calif.

[73] Assignee: The United States of America as represented by the Secretary of the Navy, Washington, D.C.

[22] Filed: June 28, 1973

[21] Appl. No.: 374,748

[52] U.S. Cl.............. 332/7.51, 331/94.5, 250/199, 356/100
[51] Int. Cl................................................ H01s 3/02
[58] Field of Search.............. 331/94.5 A, 94.5 C; 332/7.51; 250/199; 350/162 R, 160; 356/100, 5

[56] References Cited
UNITED STATES PATENTS

| | | | |
|---|---|---|---|
| 3,565,528 | 2/1971 | Witte | 356/5 |
| 3,739,295 | 6/1973 | Shah | 331/94.5 C |
| 3,743,965 | 7/1973 | Offner | 331/94.5 C |

*Primary Examiner*—Maynard R. Wilbur
*Assistant Examiner*—N. Moskowitz
*Attorney, Agent, or Firm*—R. S. Sciascia; Roy Miller; Robert W. Adams

[57] ABSTRACT

A dye laser transmitter and receiver having a rotatable mirror used for tuning the laser and sweeping the return energy over a diode array.

9 Claims, 1 Drawing Figure

3,849,742

SYNCHRONOUSLY TUNED LASER TRANSMITTER AND RECEIVER

CROSS REFERENCES TO RELATED APPLICATIONS

U.S. Pat. application Ser. No. 285,979, entitled Rapidly, Continuously and Synchronously Tuned Laser and Laser Detector, filed Sept. 5, 1972, by the inventor of the present application.

U.S. Pat. application Ser. No. 287,113, entitled Rapidly, Tunable Laser, filed Sept. 1, 1972, by the inventor of the present application.

BACKGROUND OF THE INVENTION

Continuously tunable lasers are presently operational and are being developed. Before such a tunable instrument or system can be useful in many applications, however, a detector that can be synchronously tuned to the laser output wavelength must be available. The present invention is directed to a system for continuously, rapidly and synchronously tuning a laser and laser detector.

Most prior systems were limited to a single wavelength, e.g., a ruby laser, which emits at 6,943 A. and requires a detector tuned to 6,943 A. The tuning that existed in the prior systems provided for the highest possible detector signal-to-ratio (S/N) and were accomplished by placing a narrow bandpass spectral filter in front of the detector. The filter passed the laser wavelength and rejected practically all other wavelengths. This approach, however, merely increased the signal-to-noise-ratio.

The only other prior system known is that disclosed in U.S. Pat. application Ser. No. 285,979, referenced above. That system incorporates a Fabry-Perot interferometer (FPI) wherein one of the FPI optical reflectors is mounted on an electronically driven piezoelectric crystal, and the separation of the FPI optical reflectors is varied by varying the voltage driving the crystal.

SUMMARY OF THE INVENTION

The present invention comprises the tunable laser of U.S. Pat. application Ser. No. 287,113, referenced above, Cassegrainian collecting optics for receiving the reflected laser beam, a series of optical components, and a diode array. One of the optical components utilized by the receiver portion of the present invention is the rotatable mirror of the tunable laser. In this approach, the mirror is the only moving part. It operates to synchronously tune the laser and scan the returning beam across the diode array.

BRIEF DESCRIPTION OF THE DRAWING

The Drawing is a plan view of the preferred embodiment of the present invention.

DESCRIPTION OF THE PREFERRED EMBODIMENT

Figure 1:
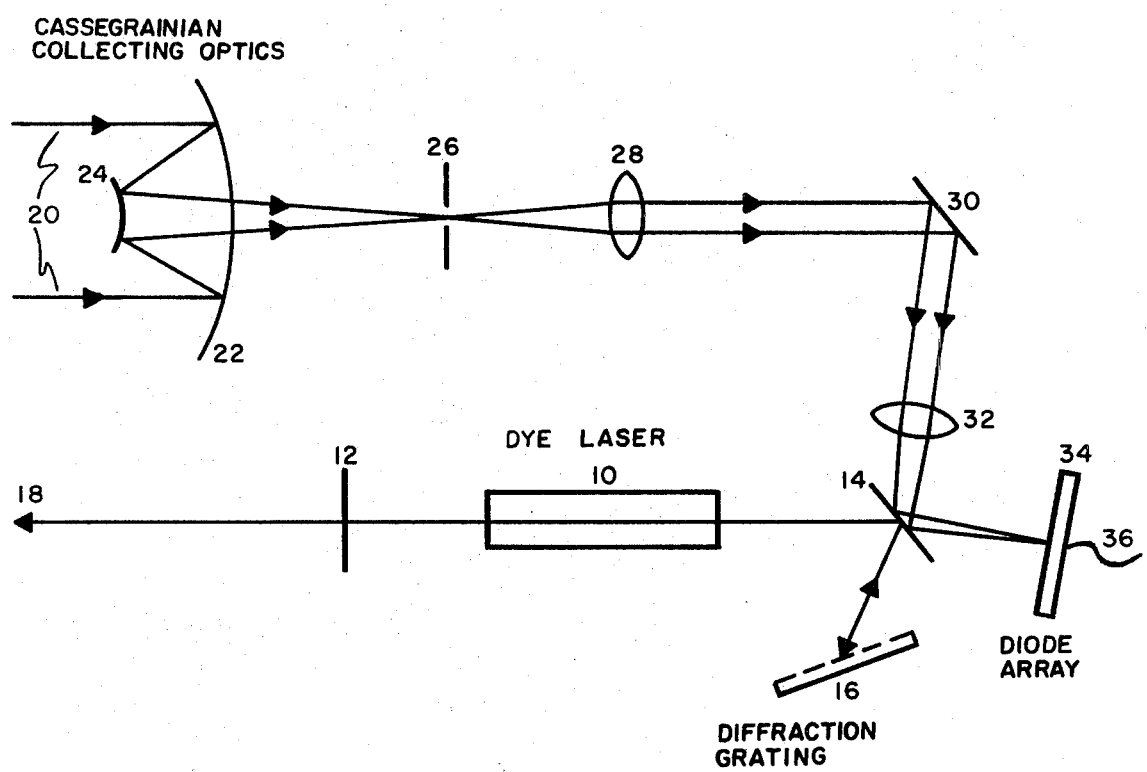

The FIGURE is a plan view of the preferred embodiment of the present invention showing the rapidly tunable laser which forms the laser transmitter. The tunable laser is fully disclosed and described in U.S. Pat. application Ser. No. 287,113, which is incorporated herein by reference, and includes dye cell 10, output mirror 12 providing output beam 18, rotatable mirror 14, and diffraction grating 16 which operates to reflect each wavelength incident thereon back along its path at its individual respective angle of incidence (retroflective reflection). By rotating rotatable mirror 14 the laser beam is scanned across diffraction grating 16, thereby changing the wavelength of output 18 of the laser cell.

The reflected, or otherwise returned, portion of output beam 18 is shown being received by the Cassegrainian collecting optics as beam 20. The Cassegrainian collecting optics include mirrors 22 and 24 for collecting the incoming light beam and directing the beam to pin-hole 26. The pin-hole, or stop, 26 passes, for processing, only the beam that converges at the iris of stop 26. As a result, the remainder of the receiver is exposed only to the beam passed by stop 26.

The beam is directed into parallel rays by lens 28, reflected by stationary mirror 30, and converged by lens 32 onto rotatable mirror 14.

Both sides of mirror 14 are reflective, and are parallel. As a result, the tilt of mirror 14 as seen by the tunable laser is the same tilt as seen by the beam of the receiver. And, when mirror 14 is rotated to a new position to tune the frequency of output beam 18, the identical change in tilt is seen by the beam of the receiver.

As mirror 14 is rotated the beam of the receiver traces a scan across the face of diode array 34. As a result, each position of rotatable mirror 14 defines the frequency of output beam 18 and the diode of diode array 34 onto which the beam of the receiver is directed.

Output 36 is symbollic of the output of the diodes which may be coupled to additional processing components to present the resultant information in the appropriate format for the intended application.

To reiterate, the rapidly rotatable, dual faced, fully reflective mirror 14 provides for the means to synchronously tune the laser and detect the returning beam. Mirror 14 changes the angle of incidence, and hence, the wavelength of the light reflected by diffraction grating 16, which wavelength determines the mission wavelength, i.e., the wavelength of output 18. Mirror 14 also sweeps the returning and received energy 20 over a linear diode array 34, such that each wavelength band falls on a particular diode. The array is scanned in synchronism with the tuning sweep of the laser. The resolution of the system is determined by the grating dispersion, which is typically 13.6 nm/1 degree of mirror rotation; the maximum beam convergence, or minimum image size on the diode array; and, the spacing of the diodes and the distance between the diodes and the mirror.

What is claimed is:

1. A synchronously tuned laser transmitter and receiver, comprising:
    a laser including a laser cavity bounded at one end by an output mirror; a dual faced, reflective member in the path of the laser beam; and reflecting means at the opposite end of said cavity and in the reflective field of one face of said reflective member for retroflectively reflecting those wavelengths that are incident thereon at the retroflective angle unique to each wavelength;
    a laser receiver for receiving the reflected output beam of said laser including collecting means for collecting the reflected beam received, processing and directing means for processing the beam into a form compatible with the detector used in said transmitter and receiver and directing said processed beam onto the other face of said reflective member, and a detector in the reflective field of said other face for providing an electrical output in response to said processed beam.

2. The apparatus of claim 1, further comprising means for tuning said laser coupled to said member.

3. The apparatus of claim 2 wherein said member is moveable and tuning is accomplished by moving said member.

4. The apparatus of claim 3 wherein both faces of said dual faced member move in unison when said member is moved.

5. The apparatus of claim 4 wherein said faces are parallel.

6. The apparatus of claim 4 wherein said reflecting means is a reflective diffraction grating.

7. The apparatus of claim 4 wherein said collecting means is Cassegrain collecting optics.

8. The apparatus of claim 4 wherein said processing and directing means includes an iris stop and a plurality of lenses.

9. The apparatus of claim 4 wherein said laser is an organic dye laser.

* * * * *